United States Patent
Kayyoor et al.

(10) Patent No.: US 11,036,800 B1
(45) Date of Patent: Jun. 15, 2021

(54) SYSTEMS AND METHODS FOR CLUSTERING DATA TO IMPROVE DATA ANALYTICS

(71) Applicant: Veritas Technologies LLC, Mountain View, CA (US)

(72) Inventors: Ashwin Kayyoor, Sunnyvale, CA (US); Henry Aloysius, San Jose, CA (US); Bashyam Tca, Saratoga, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 722 days.

(21) Appl. No.: 15/141,868

(22) Filed: Apr. 29, 2016

(51) Int. Cl.
*G06F 16/00* (2019.01)
*G06F 16/901* (2019.01)
*H04L 12/58* (2006.01)
*G06F 16/28* (2019.01)

(52) U.S. Cl.
CPC ........ *G06F 16/9024* (2019.01); *G06F 16/287* (2019.01); *H04L 51/32* (2013.01)

(58) Field of Classification Search
CPC ......... G06F 17/30353; G06F 17/30598; G06F 16/285; G06F 16/2322; G06F 16/9024; G06F 16/95; G06F 16/287; G06Q 10/107; G06Q 50/01; H04L 51/00; H04L 51/16; H04L 51/34; H04L 67/104; H04L 67/1095; H04L 67/1097; H04L 51/32
See application file for complete search history.

(56) References Cited

U.S. PATENT DOCUMENTS

| | | | | |
|---|---|---|---|---|
| 8,452,851 | B2 * | 5/2013 | Kabiljo | G06F 17/30861 705/1.1 |
| 9,596,196 | B1 * | 3/2017 | Hills | H04L 51/00 |
| 2005/0038533 | A1 * | 2/2005 | Farrell | G06F 17/30958 700/73 |
| 2011/0010182 | A1 * | 1/2011 | Turski | G06Q 10/107 705/1.1 |
| 2011/0103682 | A1 * | 5/2011 | Chidlovskii | G06K 9/6284 382/159 |
| 2013/0031061 | A1 * | 1/2013 | Jagota | G06Q 30/01 707/690 |
| 2015/0120721 | A1 * | 4/2015 | Kim | G06Q 30/02 707/728 |
| 2015/0213370 | A1 * | 7/2015 | Chakrabarti | G06N 7/005 706/52 |
| 2015/0269211 | A1 * | 9/2015 | da Silva | G06F 17/30598 707/725 |

(Continued)

*Primary Examiner* — Shew Fen Lin
(74) *Attorney, Agent, or Firm* — FisherBroyles, LLP

(57) ABSTRACT

A computer-implemented method for clustering data to improve data analytics may include (1) extracting a social graph from a data set of messages, the social graph indicating messages as edges such that nodes of the edges indicate corresponding senders and recipients in sender-recipient relationships, (2) detecting communities of collaborators by identifying clusters of nodes within the social graph, (3) applying the identified clusters of nodes within the social graph to a grouping calculation to group the messages of the data set into groups of messages, and (4) providing, through a computing interface, results of a data analytics operation to an end user based at least in part on applying the identified clusters of nodes within the social graph to the grouping calculation. Various other methods, systems, and computer-readable media are also disclosed.

20 Claims, 7 Drawing Sheets

(56) References Cited

U.S. PATENT DOCUMENTS

| | | | |
|---|---|---|---|
| 2015/0269242 A1* | 9/2015 | Dey | H04L 51/16 |
| | | | 707/737 |
| 2017/0031931 A1* | 2/2017 | Linda | G06F 16/29 |
| 2017/0039246 A1* | 2/2017 | Bastide | G06F 16/9024 |
| 2017/0085640 A1* | 3/2017 | Mandal | H04L 67/1095 |
| 2018/0136933 A1* | 5/2018 | Kogan | G06F 9/466 |

* cited by examiner

Email
402

To: Bill
CC: Charlie
From: Alice

Let's have an HR business meeting on Monday.

Email
404

To: Alice
From: Bill

OK, let's meet then.

Email
406

To: Alice
From: Charlie

I agree. See you then.

Email
408

To: Xavier
From: Yvonne

Do you agree with these engineering schematics?

Email
410

To: Zachary
From: Yvonne

Do you agree with these engineering schematics?

Social Graph
210

214

SYSTEMS AND METHODS FOR CLUSTERING DATA TO IMPROVE DATA ANALYTICS

BACKGROUND

Individuals and organizations often seek to process large sets of data according to one or more data analytics operations. For example, organizations may seek to process a large set of data according to a litigation discovery request using e-discovery software. In these examples, processing the data may involve tagging documents as either relevant or not relevant to the pending litigation and corresponding discovery request.

Unfortunately, as the size of data grows, the ability to process the data efficiently diminishes. For example, a large set of data may include several different clusters of documents such that each cluster is directed to a distinct area of subject matter. In other words, one cluster of documents might not have a significant connection or relevance to another cluster of documents. In these examples, a human reviewer may find it especially challenging to answer the discovery request by processing such a large set of data that contains multiple clusters of documents directed to distinct areas of subject matter. For these reasons, enterprise organizations may seek technological solutions for properly identifying clusters of subject matter to suitably breakup large data sets into more manageable subsets. Similarly, enterprise organizations may seek technological solutions for identifying close collaborators of a user, as well as organization department hierarchies, from a large data set of documents in a more efficient and streamlined manner, as discussed further below. Accordingly, the instant disclosure identifies and addresses a need for additional and improved systems and methods for clustering data to improve data analytics.

SUMMARY

As will be described in greater detail below, the instant disclosure generally relates to systems and methods for clustering data to improve data analytics by, for example, first extracting a social graph from address field metadata of corresponding messages and, second, then identifying clusters of users within the social graph and grouping the underlying messages according to, or based on, the identified clusters of users, as discussed further below. In one example, a computer-implemented method for clustering data to improve data analytics may include (1) extracting a social graph from a data set of messages, the social graph indicating messages as edges within the social graph such that nodes of the edges indicate corresponding senders and recipients in sender-recipient relationships, (2) detecting communities of collaborators by identifying clusters of nodes within the social graph, (3) applying the identified clusters of nodes within the social graph to a grouping calculation to group the messages of the data set into groups of messages, and (4) providing, through a computing interface, results of a data analytics operation to an end user based at least in part on applying the identified clusters of nodes within the social graph to the grouping calculation to group the messages of the data set into the clusters of messages.

In one embodiment, the messages include emails and/or email attachments. In a further embodiment, the data analytics operation may include (1) an e-discovery operation, (2) a digital forensics operation, and/or (3) a data retention operation. In some examples, extracting the social graph is performed based on a value in at least one of the following fields: (1) a sender address field in a message in the messages, (2) a recipient address field in the message in the messages, (3) a carbon copy address field in the message in the messages, and/or (4) a blind carbon copy address field in the message in the messages.

In one embodiment, the identified clusters of nodes within the social graph indicate separate departments within an enterprise organization such that members of a department tend to message other members within the same department rather than a different department according to a statistical measurement. In a further embodiment, the data analytics operation discovers departments within the enterprise organization and/or corresponding message topics that were previously unknown to a system performing the data analytics operation.

In some examples, identifying clusters of nodes within the social graph may include minimizing a number of edges that cross between the clusters. In further examples, minimizing the number of edges that cross between the clusters may include performing a smart user replication operation that replicates at least one user from one cluster to a separate cluster.

In some examples, minimizing the number of edges that cross between the clusters may include performing a smart user replication operation that replicates at least one user from one cluster to a separate cluster until the number of edges that cross between the clusters is zero. In some examples, applying the identified clusters of nodes within the social graph to the grouping calculation to group the messages of the data set into the groups of messages may include, for one of the identified clusters, adding each message that identifies two separate users from the same one of the identified clusters in at least one address field of the message to a corresponding group of messages.

In one embodiment, a system for implementing the above-described method may include several modules stored in memory, including (1) an extraction module, stored in memory, that extracts a social graph from a data set of messages, the social graph indicating messages as edges within the social graph such that nodes of the edges indicate corresponding senders and recipients in sender-recipient relationships, (2) a detection module, stored in memory, that detects communities of collaborators by identifying clusters of nodes within the social graph, (3) an application module, stored in memory, that applies the identified clusters of nodes within the social graph to a grouping calculation to group the messages of the data set into groups of messages, (4) a provisioning module, stored in memory, that provides, through a computing interface, results of a data analytics operation to an end user based at least in part on applying the identified clusters of nodes within the social graph to the grouping calculation to group the messages of the data set into the groups of messages, and (5) at least one physical processor configured to execute the extraction module, the detection module, the application module, and the provisioning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) extract a social graph from a data set of messages, the social graph indicating messages as edges within the social graph such that nodes of the edges indicate corresponding senders and recipients in sender-recipient relationships, (2) detect communities of collaborators by identifying clusters of nodes within the social graph, (3) apply the identified clusters of nodes within the social graph to a grouping calculation to group the messages of the data set into groups of messages, and (4) provide, through a computing interface, results of a data analytics operation to an end user based at least in part on applying the identified clusters of nodes within the social graph to the grouping calculation to group the messages of the data set into the groups of messages.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of embodiments and are a part of the specification. Together with the following description, these drawings demonstrate and explain various principles of the instant disclosure.

Figure 1:
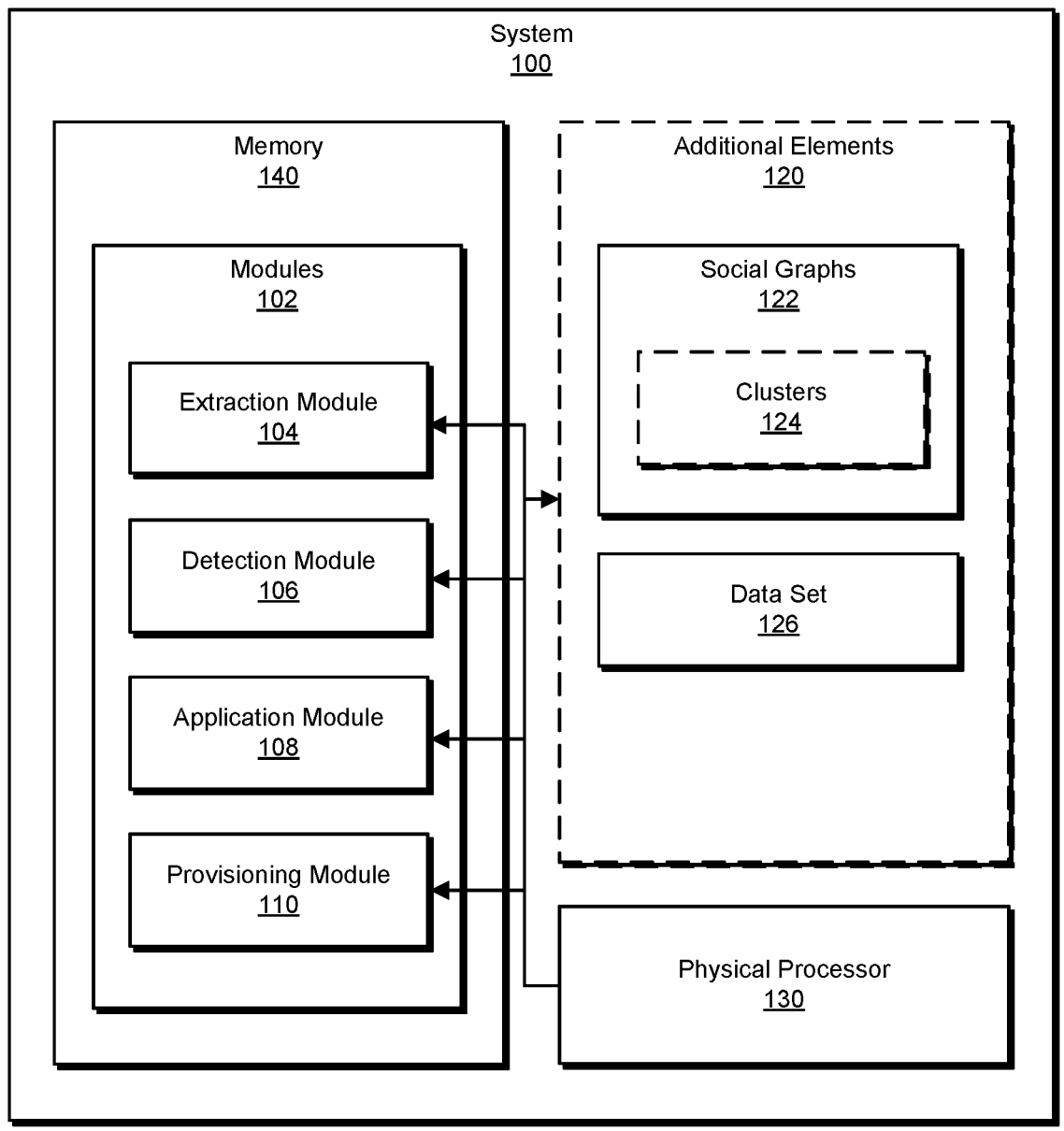
FIG. 1 illustrates a block diagram of an example system for clustering data to improve data analytics.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for clustering data to improve data analytics. As will be explained in greater detail below, the disclosed systems and methods may process large data sets to identify social clusters, organization departments, and/or user collaborators, as well as their corresponding groups of messages, more quickly and efficiently than other technologies. In some examples, the disclosed systems and methods may only process message address field information, without further processing or parsing the bodies of the messages, thereby improving the speed and performance of the data analytics operations.

Figure 2:
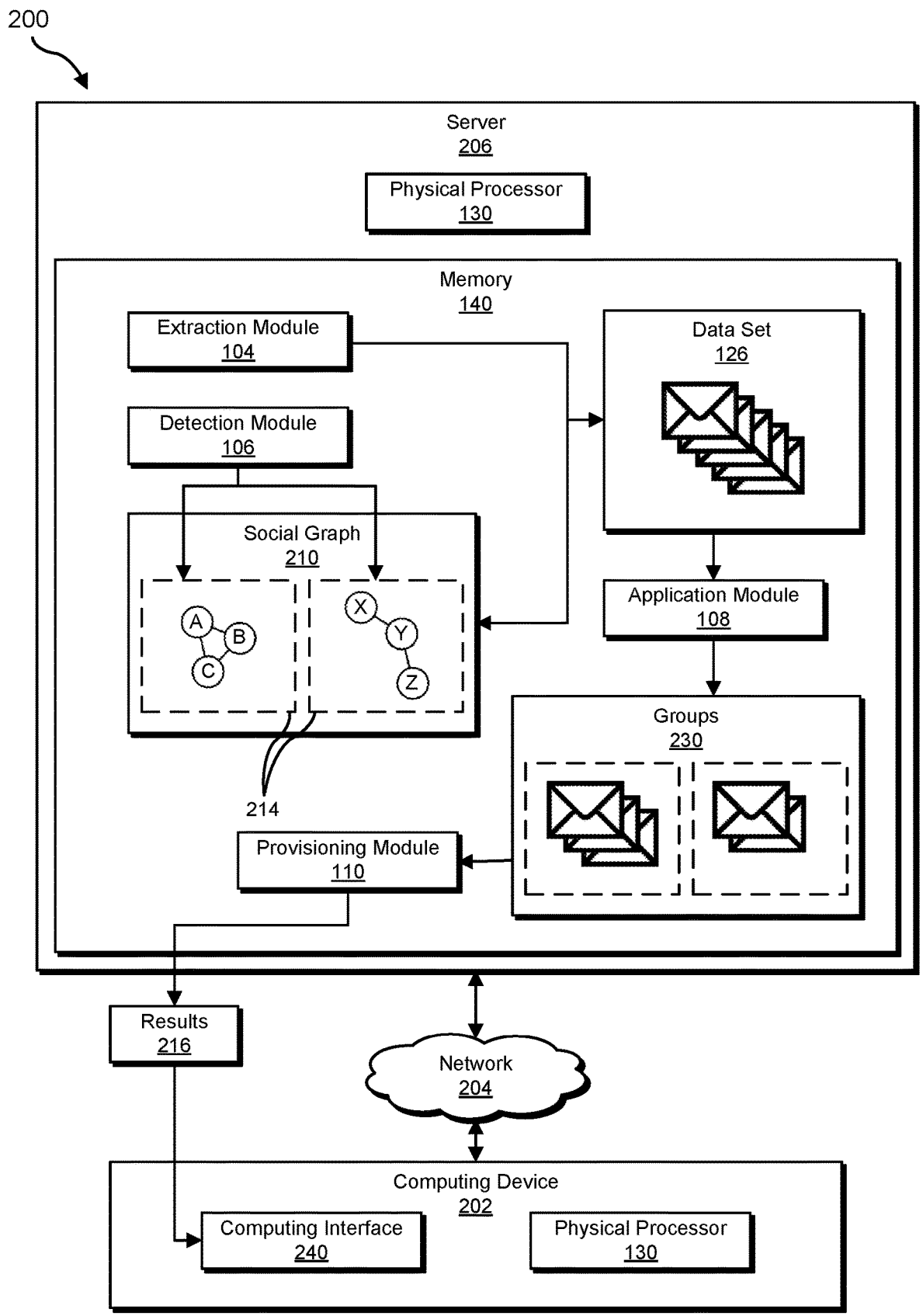
FIG. 2 illustrates a block diagram of another example system for clustering data to improve data analytics.

The following will provide, with reference to FIGS. 1-2, detailed descriptions of systems for clustering data to improve data analytics. Detailed descriptions of corresponding computer-implemented methods will also be provided in connection with FIGS. 3-5. In addition, detailed descriptions of a computing system and network architecture capable of implementing one or more of the embodiments described herein will be provided in connection with FIGS. 6 and 7, respectively.

FIG. 1 is a block diagram of an example system 100 for clustering data to improve data analytics. As illustrated in this figure, system 100 may include one or more modules 102 for performing one or more tasks. For example, and as will be explained in greater detail below, system 100 may include an extraction module 104 that extracts a social graph from a data set of messages. The social graph may indicate messages as edges within the social graph such that nodes of the edges indicate corresponding senders and recipients in sender-recipient relationships. System 100 may additionally include a detection module 106 that detects communities of collaborators by identifying clusters of nodes within the social graph. System 100 may also include an application module 108 that applies the identified clusters of nodes within the social graph to a grouping calculation to group the messages of the data set into groups of messages. Furthermore, system 100 may additionally include a provisioning module 110 that provides, through a computing interface, results of a data analytics operation to an end user based at least in part on applying the identified clusters of nodes within the social graph to the grouping calculation to group the messages of the data set into the groups of messages. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of network architecture 700 in FIG. 7. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As further illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate clustering data to improve data analytics. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Notably, system 100 may also include one or more additional elements 120, which may be stored within a database. Additional elements 120 may be configured to store social graphs 122, which may indicate relationships between different persons or users, as discussed further below. In these examples, nodes of the social graph correspond to persons or users and the edges between the nodes indicate the corresponding relationships. As further shown in this figure, social graphs 122 may include clusters 124, which may correspond to persons or users that are associated or related to each other along one or more dimensions, such as employees who belong to the same department within an enterprise organization. Additionally, additional elements 120 may be configured to store a data set 126, which may include emails from which social graphs 122 and clusters 124 may be extracted, as discussed further below.

The database of additional elements 120 may represent portions of a single database or computing device or a plurality of databases or computing devices. For example, the database may represent a portion of server 206 in FIG. 2, computing system 610 in FIG. 6, and/or portions of network architecture 700 in FIG. 7. Alternatively, additional elements 120 in FIG. 1 may represent one or more physically separate devices capable of being accessed by a computing device, such as server 206 in FIG. 2, computing system 610 in FIG. 6, and/or portions of network architecture 700 in FIG. 7.

System 100 in FIG. 1 may be implemented in a variety of ways. For example, all or a portion of system 100 may represent portions of system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in additional elements 120. Additionally or alternatively, server 206 may be programmed with one or more of modules 102 and/or may store all or a portion of the data in additional elements 120. Notably, although FIG. 2 shows that all of modules 102 reside on server 206, any one or more of these modules may be shared or relocated to another device, such as computing device 202, or another device such as a proxy device, according to any permutation suitable for the performance of method 300, as discussed further below.

In one embodiment, one or more of modules 102 from FIG. 1 may, when executed by at least one processor of computing device 202 and/or server 206, enable computing device 202 and/or server 206 to cluster data to improve data analytics. For example, extraction module 104 may extract a social graph 210 from data set 126 of messages. Social graph 210 indicates messages as edges within social graph 210 such that nodes of the edges indicate corresponding senders and recipients in sender-recipient relationships. Detection module 106 may detect communities 214 of collaborators by identifying clusters of nodes within the social graph. Application module 108 may apply the identified clusters of nodes within social graph 210 to a grouping calculation to group the messages of data set 126 into groups of messages, such as groups 230. Provisioning module 110 may provide, through a computing interface 240, results 216 of a data analytics operation to an end user based at least in part on applying the identified clusters of nodes within social graph 210 to the grouping calculation to group the messages of data set 126 into the groups of messages.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, computing system 610 in FIG. 6, or any other suitable computing device.

Server 206 generally represents any type or form of computing device that is capable of facilitating the clustering of data to improve data analytics in accordance with method 300, as discussed further below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network architecture 700 in FIG. 7, or the like. Network 204 may facilitate communication or data transfer using wireless or wired connections. In one embodiment, network 204 may facilitate communication between computing device 202 and server 206.

Figure 3:
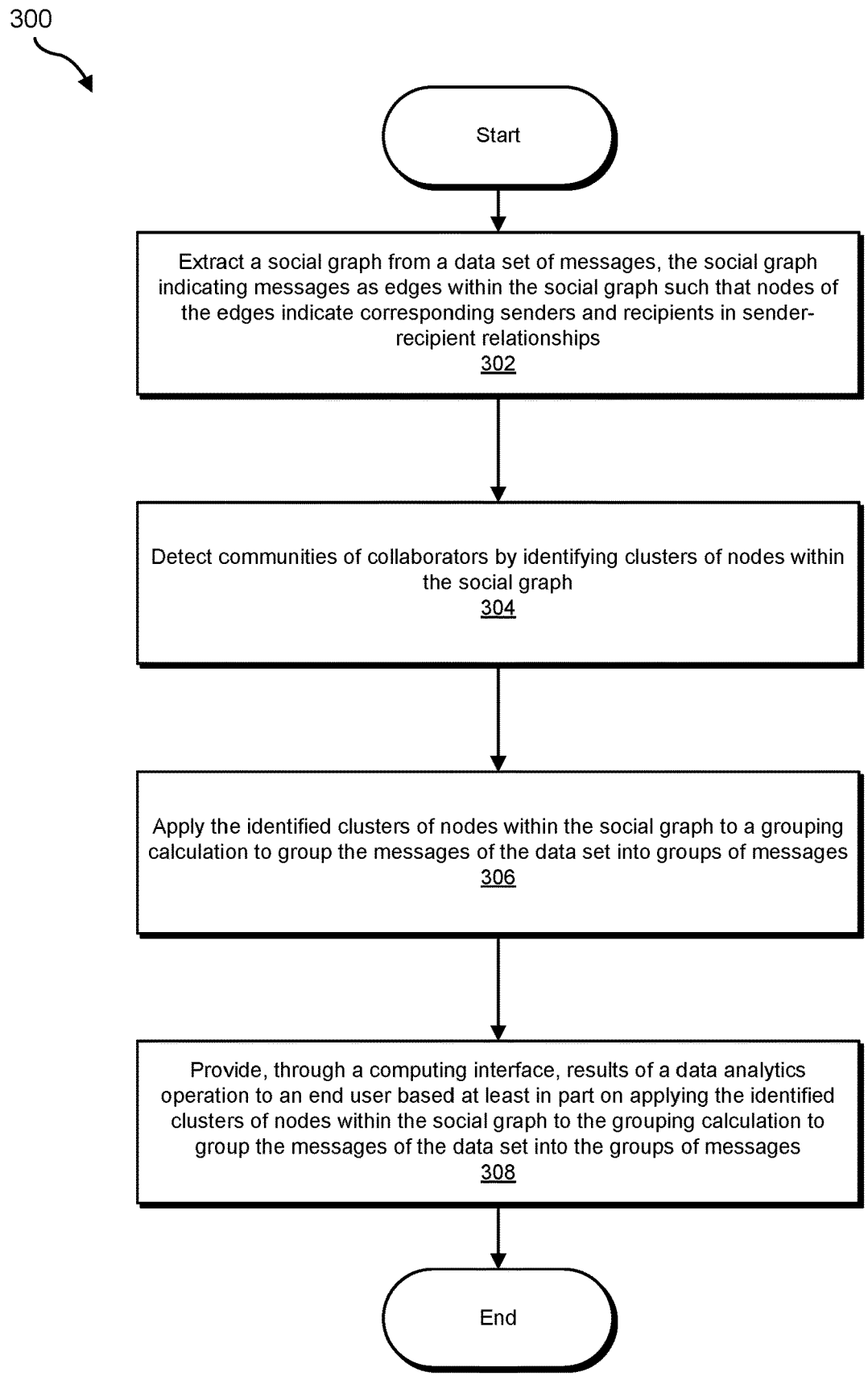
FIG. 3 illustrates a flow diagram of an example method for clustering data to improve data analytics.

FIG. 3 is a flow diagram of an computer-implemented method 300 for clustering data to improve data analytics. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of network architecture 700 in FIG. 7.

As illustrated in FIG. 3, at step 302, one or more of the systems described herein may extract a social graph from a data set of messages. For example, extraction module 104 may, as part of server 206 in FIG. 2, extract social graph 210 from data set 126. Social graph 210 may indicate messages as edges within social graph 210 such that nodes of the edges indicate corresponding senders and recipients in sender-recipient relationships.

As used herein, the term "sender-recipient relationships" simply refers to the fact that a sender has transmitted at least one message to a specified recipient, thereby creating the sender-recipient relationship. In the example of FIG. 2, the users A and B within social graph 210 are in a sender-recipient relationship (e.g., because user A transmitted a message to user B). Additionally, as used herein, the term "messages" generally refers to any documents that specify a sender and/or author, on the one hand, and a target or recipient, on the other hand. In some examples, messages may include emails, email attachments, POWERPOINT or slide presentation documents, word processing documents, as well as files and/or file servers, whenever these specify a sender/author and target/recipient, as outlined above.

Additionally, as used herein, the term "social graph" generally refers to any graph that indicates sender-recipient relationships using corresponding nodes and edges (see the illustrative example of social graph 210 in FIG. 2). In some examples, the social graph may be directed or undirected. Additionally, the social graph may be weighted or non-weighted, with the weights indicating message length, message transmission time, and/or message frequency or number. In some examples, the social graph may only include single instances of a corresponding user or may include multiple instances of the same user. In further examples, the social graph may indicate multiple edges between the same two nodes to indicate distinct messages or, additionally or alternatively, may indicate a single edge between the same two nodes to indicate any number of distinct messages. As used herein, the phrase "extract a social graph from a data set of messages" generally refers to extracting data or information from the set of messages to build or construct a data structure (e.g., a list of user pairs) that defines a social graph, as discussed further below.

Extraction module 104 may extract the social graph from the messages in a variety of ways. In one embodiment, the messages include emails and/or email attachments, as further described above. In additional examples, extraction module 104 may extract the social graph based on a value in at least one of the following fields: (1) a sender address field in a message in the messages, (2) a recipient address field in the message in the messages, (3) a carbon copy address field in the message in the messages, and/or (4) a blind carbon copy address field in the message in the messages. In other words, extraction module 104 may extract an email address, other address, or other identifier or location, from the sender (i.e., "from") address field to identify the corresponding sender of the message. Additionally, extraction module 104 may extract an email address, other address, or other identifier or location from one or more of the recipient (i.e., "to") address field, carbon copy (i.e., "cc") address field, and/or blind carbon copy (i.e., "bcc") address field as the recipient(s) of an instance of the message. Notably, sending a message with multiple target addresses (e.g., by listing multiple addresses in the "to" field and/or by listing one or more addresses within the carbon copy and/or blind carbon copy address fields) may effectively create multiple messages, which may each create corresponding sender-recipient relationships, as outlined above. In general, extraction module 104 may read, parse, and/or extract values and/or metadata from address fields within a message metadata section or header to partially construct a social graph and model of the corresponding sender-recipient relationship(s).

Figure 4:
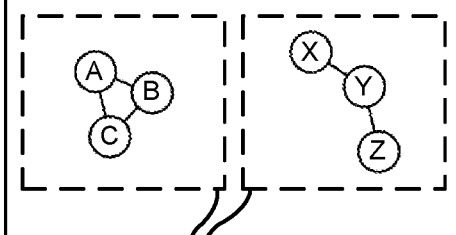
FIG. 4 illustrates a block diagram of example emails and a corresponding social graph.

FIG. 4 shows examples of emails, including an email 402, an email 404, an email 406, an email 408, and an email 410. These emails may correspond to the email icons within data set 126 as shown within FIG. 2 and discussed further above. Notably, these examples show that Bill emailed Charlie and Alice (email 402), Alice emailed Bill (email 404), Alice emailed Charlie (email 406), Xavier emailed Yvonne (email 408), and Zachary emailed Yvonne (email 410). Using the first initial of the sender/recipient names, FIG. 4 further shows that extraction module 104 extracted social graph 210 from these emails using the sender/recipient address fields, as discussed further above.

Returning to FIG. 3, at step 304, one or more of the systems described herein may detect communities of collaborators by identifying clusters of nodes within the social graph. For example, detection module 106 may, as part of server 206 in FIG. 2, detect communities 214 of collaborators by identifying clusters of nodes within social graph 210.

As used herein, the term "communities of collaborators" simply refers to users who have tended to message each other rather than others within a larger community or enterprise organization, according to a statistical measurement or clustering calculation, and therefore are presumed to collaborate together within a corresponding work environment or similar environment. Similarly, the term "clusters of nodes" generally refers to clusters within a graph, as identified by a graph or mathematical clustering calculation or algorithm. Notably, in some examples, the clusters of nodes may not be entirely isolated from each other within social graph 210 (e.g., may still include some crossover edges between clusters). Moreover, in further examples, one or more of modules 102 may massage or adjust social graph 210 to reduce or eliminate crossover edges between separate clusters, as discussed further below.

Detection module 106 may identify clusters of nodes within the social graph using any suitable graph or mathematical clustering calculation or algorithm, including conventional or traditional clustering algorithms. Representative (yet optional) examples of suitable clustering or partitioning algorithms include "Louvain's method optimizing Newman's modularity" (see https://perso.uclouvain.be/vincent.blondel/research/louvain.html—which is hereby incorporated by reference in its entirety), the "community.partition_at_level" function of the "community" API within the NETWORKX library for the PYTHON programming language (see http://perso.crans.org/aynaud/communities/api.html—which is hereby incorporated by reference in its entirety), the "METIS" algorithm (see http://glaros.dtc.umn.edu/gkhome/metis/metis/overview—which is hereby incorporated by reference in its entirety), and/or the "N-CUT" algorithm (see http://www.eecs.berkeley.edu/~efros/courses/AP06/Papers/boykov-iccv-01.pdf—which is hereby incorporated by reference in its entirety).

Moreover, as mere examples, these algorithms may include any one or more of the algorithms described in the Wikipedia article "cluster analysis," which is hereby incorporated by reference in its entirety (all incorporated references herein were accessed 17 Apr. 2016). Detection module 106 may also identify the clusters by receiving manual tagging or identification of the clusters and/or by cooperating with a human user or administrator. Notably, any one or more clustering algorithms may specify one or more parameters that determine or establish a granularity of clustering (i.e., a tolerance or willingness to cluster data points despite a lack of density or closeness between them and/or a tolerance or willingness to cluster data points into a larger or smaller number of clusters). The values for these parameters may be somewhat arbitrarily selected so long as the selected values enable the clustering algorithm to function in accordance with method 300 to thereby improve data analytics, as discussed further below.

In one embodiment, the identified clusters of nodes within the social graph indicate separate departments within an enterprise organization. Within this enterprise organization, the members of a department tend to message other members within the same department rather than a different department. For example, members of the human resources department tend to message each other more, statistically, then they message members of the research and development department and/or other departments. This statistical tendency may be confirmed by any suitable statistical measurement or calculation and/or corresponding threshold comparison.

Figure 5:
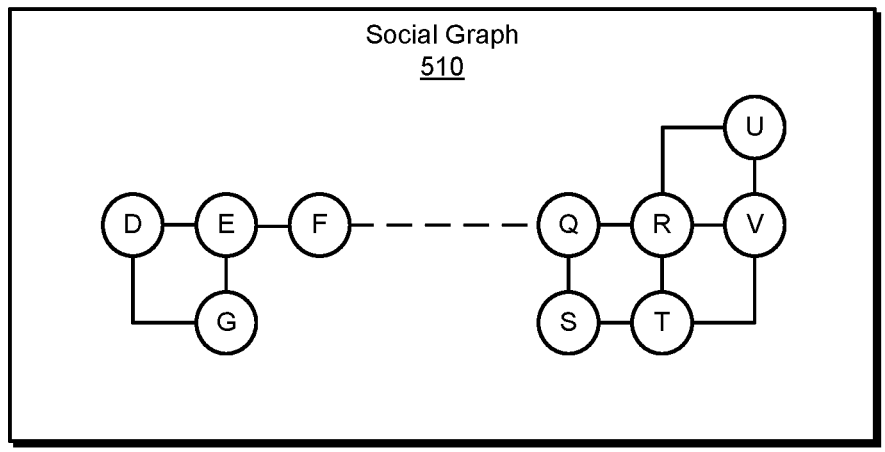
FIG. 5 illustrates a block diagram of example social graphs and corresponding groups of messages.
Figure 5:
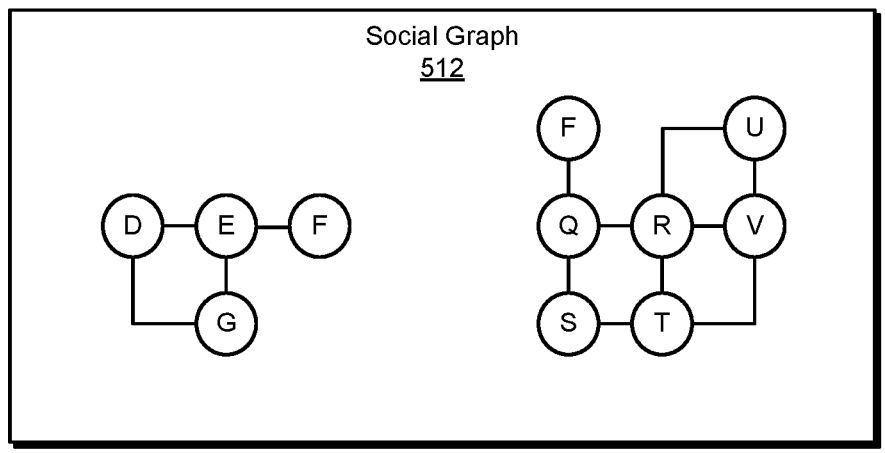
Figure 5:
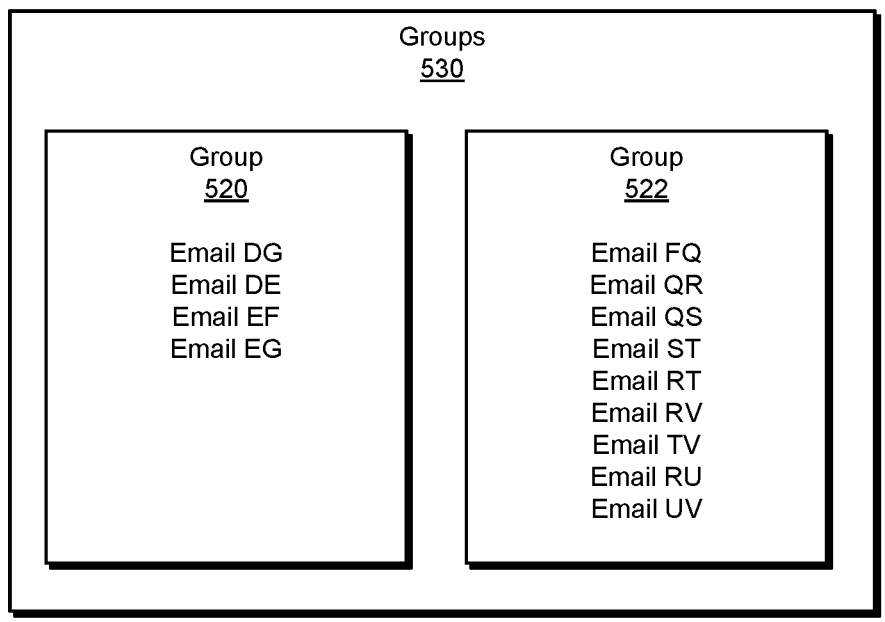

In some examples, detection module 106 may identify clusters of nodes within the social graph by minimizing a number of edges that cross between the clusters. FIG. 5 shows another example of a social graph, social graph 510, which includes two clusters of users or senders/recipients. These clusters correspond to (1) a user D, a user E, a user F, and a user G and (2) a user Q, a user R, a user S, a user T, a user U, and a user V. Notably, these two clusters are connected through an inconvenient edge between user F and user Q as shown by the dotted line within social graph 510. Because the social graph may more conveniently or usefully separate clusters without any crossover edges between them, detection module 106 may minimize the number of edges that cross between these two clusters.

In some examples, detection module 106 may reduce or minimize the number of edges that cross between the clusters by performing a smart user replication operation that replicates at least one user from one cluster to a separate cluster. More specifically, in the example of FIG. 5, detection module 106 may replicate user F from the first cluster on the left of social graph 510 to the second cluster on the right. After the smart user replication operation is performed, the result is shown within a social graph 512 of FIG. 5. In this modified social graph, user F is situated within both the left cluster and the right cluster, thereby enabling the elimination of the crossover link between user F and user Q that previously linked the two clusters, as shown within social graph 510. Although not shown in this figure, detection module 106 may additionally or alternatively replicate user Q from the right cluster to the left cluster in a parallel manner. Moreover, in further examples, detection module 106 may minimize the number of edges that cross between the clusters by performing the smart user replication operation until the number of edges that cross between the clusters (i.e., the clusters identified at step 304) is zero.

At step 306, one or more of the systems described herein may apply the identified clusters of nodes within the social graph to a grouping calculation to group the messages of the data set into groups of messages. For example, application module 108 may, as part of server 206 in FIG. 2, apply the identified clusters of nodes within social graph 210 to a grouping calculation to group the messages of data set 126 into groups of messages, such as groups 230 shown in FIG. 2. As used herein, the phrase "apply the identified clusters of nodes within the social graph to a grouping calculation" generally refers to using the identified clusters of nodes as inputs or factors into the grouping calculation such that the grouping calculation is based at least in part on the identified clusters.

Application module 108 may apply the identified clusters of nodes within the social graph to the grouping calculation in a variety of ways. In general, application module 108 may group the messages to create groups that mirror or match the clusters identified at step 304, such that messages within a group indicate messages between members of a corresponding cluster. Returning to the example of FIG. 5, application module 108 may group the messages indicated by the edges within social graph 512 into groups 530, which may include a group 520 and a group 522. As shown in this figure, group 520 includes the email from user D to user G, the email from user D to user E, the email from user E to user F, and the email from user E to user G. Group 522 includes a parallel listing of groups based on the right cluster shown within social graph 512 within FIG. 5. Notably, this example tends to assume that the edges within social graph 512 indicate a single message in one direction. Nevertheless, as further discussed above, in other examples the disclosed systems and methods may reference social graphs where edges potentially indicate multiple messages or messages in different directions.

Moreover, in a more specific example, application module 108 may apply the identified clusters of nodes by, for one of the identified clusters, adding each message that identifies two separate users from the same one of the identified clusters in at least one address field of the message to a corresponding group of messages. For example, group 520 within FIG. 5 includes the four emails listed above and shown within this figure, because both the sender and the recipient of each of these emails belongs within the left cluster shown within social graph 512, as outlined above. Similarly, if an additional message had indicated user D as the sender, user E as the recipient within the "to" field, user F within the carbon copy field, and user R within the blind carbon copy field, then group 520 would also include this additional message, because the additional message specifies at least two addresses (i.e., any two of user D, user E, and user F) within any of its address fields.

At step 308, one or more of the systems described herein may provide, through a computing interface, results of a data analytics operation to an end user based at least in part on applying the identified clusters of nodes within the social graph to a grouping calculation to group the messages of the data set into the groups of messages. For example, provisioning module 110 may, as part of server 206 in FIG. 2, provide, through computing interface 240, results 216 of a data analytics operation to an end user based at least in part on applying the identified clusters of nodes within social graph 210 to the grouping calculation to group the messages of data set 126 into the groups of messages.

As used herein, the term "computing interface" generally refers to any computing, software, hardware, and/or virtual output device suitable for reporting a result of a data analytics operation. Moreover, as used herein, the term "data analytics operation" generally refers to any operation that analyzes data to derive or discover a result or insight that the system performing the operation previously did not know or understand.

Provisioning module 110 may provide the result of the data analytics operation in a variety of ways. In general, provisioning module 110 may simply report, display, or communicate the results of the data analytics operation. In one embodiment, the data analytics operation may include at least one of: (1) an e-discovery operation, (2) a digital forensics operation, and/or (3) a data retention operation.

In a more specific embodiment, the data analytics operation of step 308 discovers departments within the enterprise organization and/or corresponding message topics that were previously unknown to a system, such as system 100 and/or system 200, performing the data analytics operation. In other words, the system may receive a data set, such as data set 126, without understanding which messages originate from which departments within an organization, without understanding what departments exist within the organization, and/or without knowing what topics of subject matter each department is directed to. Provisioning module 110 may provide the results of the data analytics operation in part by reporting discovered departments within an enterprise organization, and also optionally reporting discovered topics of subject matter about which these communities tend to communicate. For example, the human resources department will tend to communicate about hiring and termination decisions. Similarly, the research and development department will tend to communicate about new inventive improvements for consumer products and services.

The discussion above provides a comprehensive overview of the disclosed systems and methods in accordance with method 300 of FIG. 3. Additionally, the following discussion provides a more concrete and detailed overview of embodiments of the disclosed subject matter.

Businesses and governments around the world generate enormous volumes of data every day. Sifting through that data to find what is relevant to a legal or compliance matter can be costly and time consuming. Traditional techniques for finding relevant documents are falling behind as the growth of data outpaces the ability of humans to manually process them. Also, many data applications today demand near real-time analytical capability on top of the data being collected. The disclosed subject matter solves at least one problem in the domain of email clustering and analytics. Near real-time analytics for emails can bring immense value to applications such as e-discovery, forensics, data retention, and policy compliance, etc. Additionally, the disclosed subject matter may operate on other documents or artifacts, such as POWERPOINT or slide presentation documents, word processing documents, and/or files or file servers more generally, as discussed further above.

The disclosed systems and methods may build a "meta-graph" using email communications (e.g., using just email address information) in a user plane. More specifically, the disclosed systems and methods may automatically detect communities based on underlying email header, metadata, and/or address field information. The disclosed systems and methods may also optionally perform a smart replication of users to increase the quality of the clustering calculation, as discussed further above. Importantly, the disclosed systems and methods may improve upon other systems by processing emails or other documents (1) on a real-time basis and/or (2) without processing email or other document body content. The disclosed systems and methods may thereby enable data analysis that references either or both of the user plane (i.e., the social graph indicating sender/recipient relationships) and the data plane (i.e., the underlying emails or documents from which the social graph is extracted).

One example of the data analytics operation may include identifying the top N closest collaborators to a specified user (i.e., where N is an arbitrary natural number). The data analytics operation may further identify all of the data or documents that the user and/or the closest collaborators have generated.

More generally, the disclosed systems and methods may leverage the meta-graph or social graph, which represents collaborations among users, data generators, and/or sender/recipients, to thereby improve the quality or efficiency of data analytics. One key intuition that drives the disclosed systems and methods is the following: data is essentially created by social human beings based on certain contexts, interests, etc. Analyzing interpersonal relationships and/or social patterns can help a data analytics system to understand the underlying emails or documents, as well as the relationships and connections between them.

Consider the following example. An arbitrary organization may include several departments, such as the finance department, the human resources department, the technology department, and/or the marketing department, etc. Each department essentially includes people working and communicating with each other closely. On the other hand, communications between different departments is relatively rarer according to any suitable statistical calculation. For example, few persons from the finance department tend to interact with the research and development department. Rather, persons within a specific department tend to communicate with people within the same department. Moreover, even within a particular department, persons with similar interests tend to collaborate more closely than otherwise.

Additionally, consider an example of a large number of emails. At this point, the data analytics system might not yet know or understand which departments or topics to which these emails belong. In some examples, the data analytics operation may be directed to identifying or extracting these departments and/or topics. Accordingly, one can model this problem as a community detection problem where the problem is to find communities of people communicating with each other closely, according to a suitable statistical measurement, and then group the email content generated by these people accordingly.

In one specific example, the disclosed systems and methods may detect four separate communities. Accordingly, the disclosed systems and methods may group the email content generated by these four communities within four separate corresponding groups. In this example, it will be more likely that each community represents a sub-organization, department, or topic such as finance, human resources, technology, and/or marketing, etc.

In more technical terms, the disclosed systems and methods may operate in at least four stages. First, given a data set, such as a data set of email or other documents, the disclosed systems and methods may decouple the user plane from the data plane. In this example, the user plane may include meta-data indicating sender-recipient relationships, as outlined above, whereas the data plane may include the actual underlying content (i.e., the underlying emails or other documents). In the context of email data, the disclosed systems and methods may extract sender (i.e., "to"), targeted recipient, carbon copy recipient, and/or blind carbon copy recipient metadata from the email headers or other metadata. The disclosed systems and methods may thereby generate the meta-graph or social graph from this extracted address field information. In some examples, the social graph may correspond to the user plane, as described above. In these examples, each node of the social graph may correspond to a user or sender/recipient. Additionally, each edge connecting any two nodes may correspond to a communication between the two users.

As the second step, after the social graph is built, the disclosed systems and methods may analyze and process the user plane. The disclosed systems and methods may automatically detect communities in the social graph at the user plane (e.g., close communities that satisfy a suitable metric of closeness or clustering). In these examples, the disclosed systems and methods may optionally minimize the number of edges that cross between different clusters. Essentially, the disclosed systems and methods may return N number of communities of users, where N is a natural number. In these examples, each community may represent or aggregate users with similar interests, because users with similar interests tend to email each other, as described further above. After the detection of N communities, the disclosed systems and methods may detect that some edges cross between different clusters within the social graph. To improve the quality of the clustering detection, the disclosed systems and methods may perform a smart user replication operation to replicate a user between clusters such that there are no edges that cross between different clusters.

Consider the following example. There are two communities C1={Ashwin, Henry, Bashyam}, and C2={Oda, Ivy, Annu}. Additionally, there may be an edge between these two communities as follows: E={Henry, Orla}. In this example, the disclosed systems and methods may replicate users (Orla in C1 and/or Henry in C2) such that the cross edges are eliminated, thereby resulting in the following communities: C1={Ashwin, Henry, Bashyam, Orla} and C2={Henry, Orla, Ivy, Annu}.

Third, the disclosed systems and methods may apply the analysis from the user plane to the data plane. Once a number of user plane communities are detected, the disclosed systems and methods may apply the analysis of the social graph to the underlying emails or documents to thereby group the emails or documents into distinct groups. There are multiple heuristics available for applying the social graph analysis to the underlying emails or documents. Optionally, one of the heuristics that the disclosed systems and methods may apply is the following. For a given community identified within the social graph, all the emails with at least two common users from the same community are grouped together into a corresponding group at the data plane.

Fourth, the disclosed systems and methods may perform or complete a data analytics operation based on the steps described above. Given clusters of communities identified within the social graph and given emails or underlying documents identified at the data plane, the disclosed systems and methods may support data analytics on top of one or both of these layers. One supported data analytics operation is the following. Given a specific user, identify the top M closest collaborators for the user, where M is a natural number. Optionally, the disclosed systems and methods may also identify the data that the user and/or the closest collaborators have generated. In additional or alternative examples, the disclosed systems and methods may simply identify close collaborators as those nodes within the social graph that are directly or indirectly connected to a user through an arbitrary or predefined natural number of hops.

The disclosed systems and methods may result in an improvement in data clustering, as measured by the Davies-Bouldin index (the Wikipedia article for the Davies-Bouldin index is hereby incorporated by reference in its entirety, see https://en.wikipedia.org/wiki/Davies%E2%80%93Bouldin_index), in comparison to another clustering system, such as the CLUTO clustering system (e.g., resulting in an approximately 25% improvement corresponding to an approximately 25% reduction in the Davies-Bouldin index measurement). The disclosed systems and methods may also reduce clustering execution time, in comparison to the CLUTO clustering system. For example, the disclosed systems and methods may result in a reduction in execution time from approximately 300 seconds to approximately 1-10 seconds (for 100 clusters) and from approximately 1600 seconds to approximately 20-40 seconds (for 1000 clusters).

Moreover, the disclosed systems and methods may also improve upon other clustering systems, such as the CLUTO, APACHE MAHOUT, LINGPIPE, CARROT TWO, AND/OR SCIKIT LEARN K-MEANS systems, because the other systems are based on analysis of email body and/or document content, rather than just address field information, because the systems require processing of the complete data set, and/or because the systems are not scalable, whereas the disclosed systems and methods may optionally analyze just email address field information and are scalable. Additionally, the disclosed systems and methods may improve upon other clustering systems, such as clustering systems that use extended file attributes, because these other systems typically use an iterative clustering algorithm (e.g., K-MEANS clustering), which can be extremely slow and because the systems require users to attach additional tags or keywords (i.e., extended file attributes) to the files, whereas the disclosed systems and methods may perform a single pass algorithm (e.g., at least part of method 300 performed within a single pass of the data set), do not necessarily involve any manual human intervention, and/or are based on email or other document address field information resulting in the social graph, as outlined above.

Figure 6:
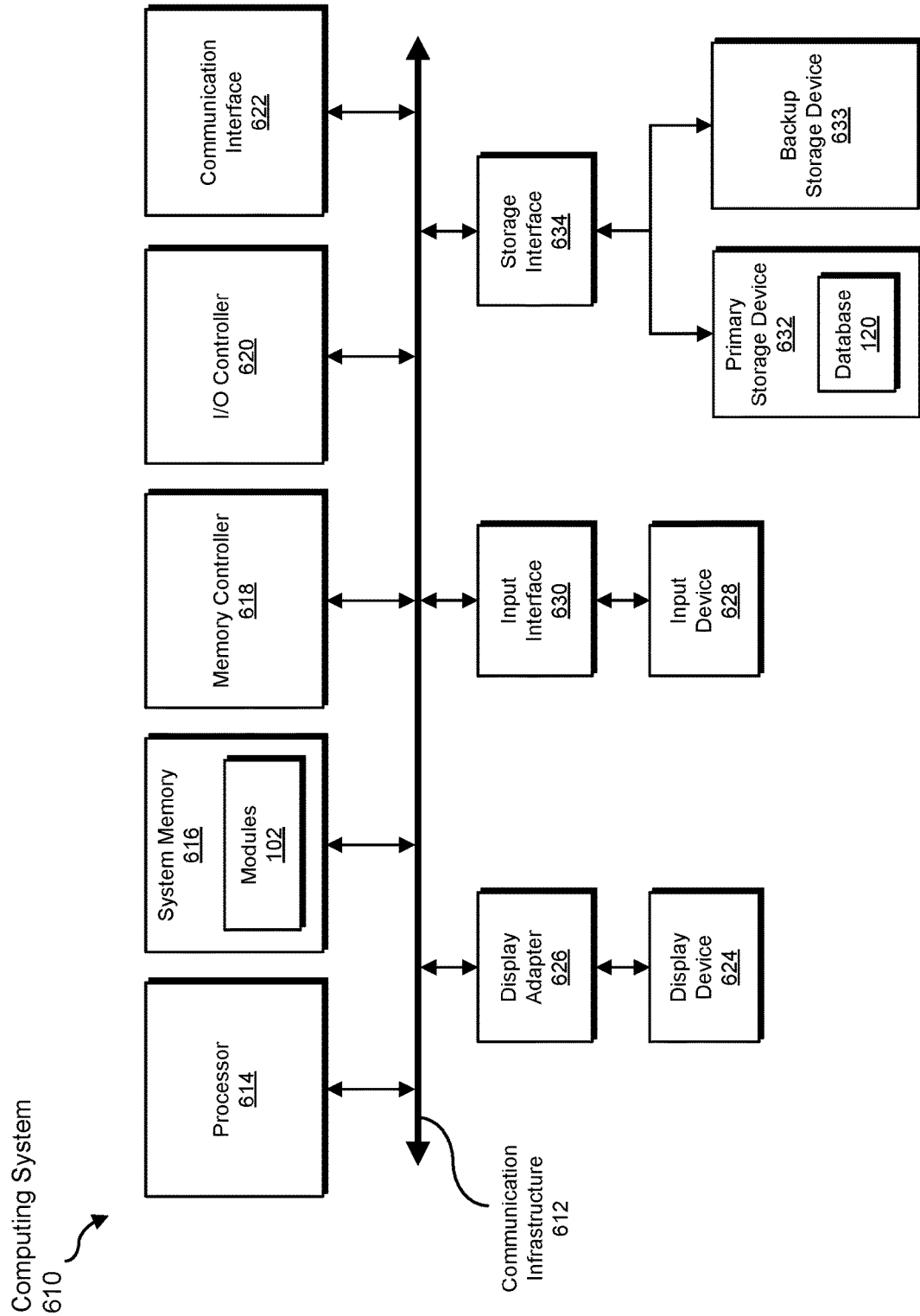
FIG. 6 illustrates a block diagram of an example computing system capable of implementing one or more of the embodiments described and/or illustrated herein.

FIG. 6 is a block diagram of a computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 610 may be configured as an Application Specific Integrated Circuit (ASIC) adapted to implement one or more of the embodiments disclosed herein.

Figure 7:
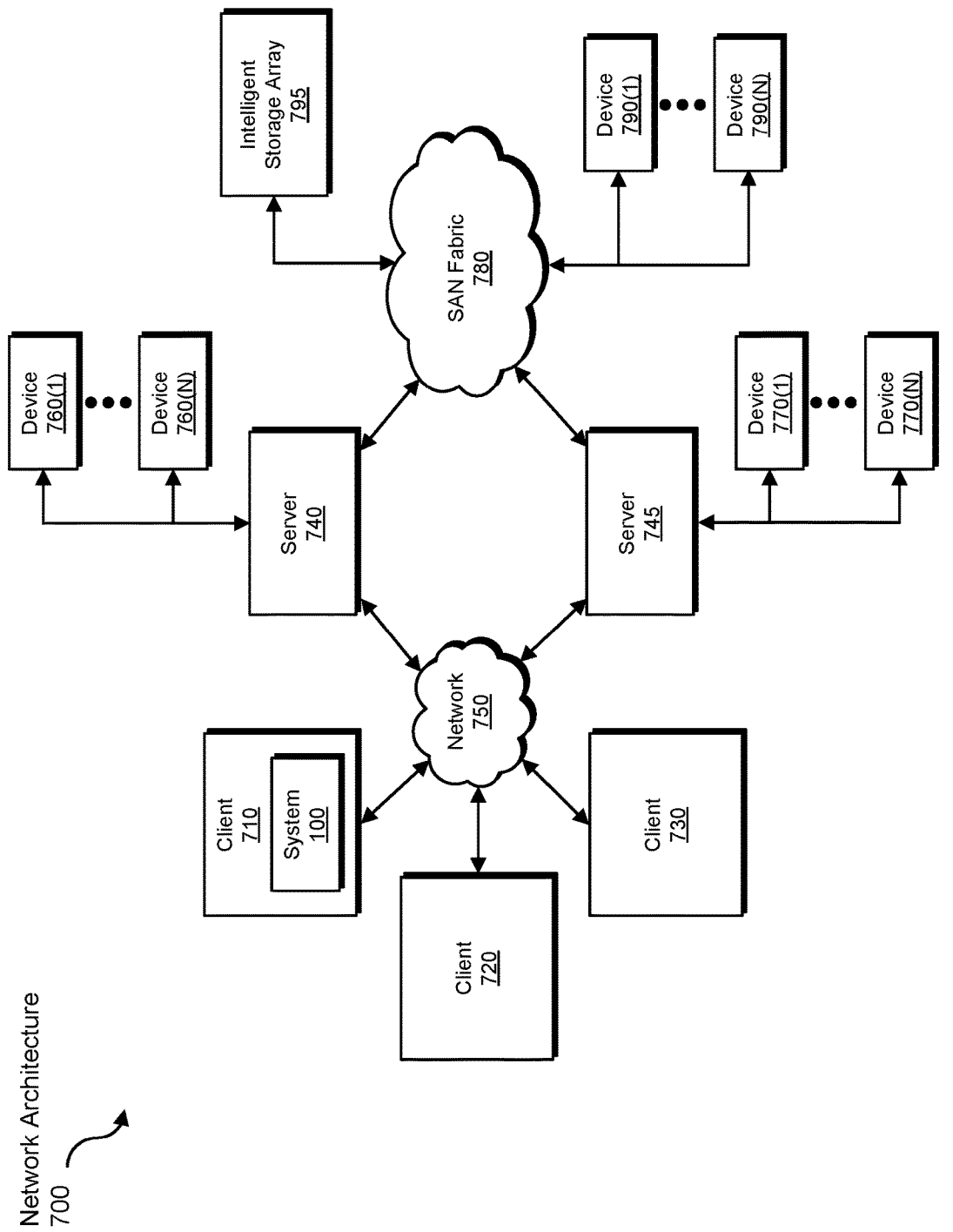
FIG. 7 illustrates a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of a method for clustering data to improve data analytics.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various methods described and/or illustrated herein may also omit one or more of the steps described or illustrated herein or include additional steps in addition to those disclosed.

While various embodiments have been described and/or illustrated herein in the context of fully functional computing systems, one or more of these embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the embodiments disclosed herein. This description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for clustering data to improve data analytics, at least a portion of the method being performed by a computing device comprising at least one processor, the method comprising:

extracting a social graph from a data set of messages, the social graph indicating messages as edges within the social graph such that nodes of the edges indicate corresponding senders and recipients in sender-recipient relationships;

detecting communities of collaborators by identifying clusters of nodes within the social graph by minimizing a number of edges that cross between the clusters by performing a smart user replication operation to replicate a user between clusters such that there are no edges that cross between different clusters;

applying the identified clusters of nodes within the social graph to a grouping calculation to group the messages of the data set into groups of messages at least in part by creating, for each respective one of the identified clusters of nodes within the social graph, a respective group of messages by adding each message that identifies two separate users from the respective one of the identified clusters in at least one address field of the message to the respective group of messages;

providing, through a computing interface, results of a data analytics operation to an end user based at least in part on applying the identified clusters of nodes within the social graph to the grouping calculation to group the messages of the data set into the groups of messages;

wherein:

the method further comprises decoupling a user plane from a data plane;

the user plane includes meta-data indicating sender-recipient relationships; and the data plane includes actual underlying content of the messages.

2. The computer-implemented method of claim 1, wherein performing the method improves an efficiency of data clustering according to the Davies-Bouldin index in comparison to another clustering system.

3. The computer-implemented method of claim 2, wherein performing the method improves the efficiency of data clustering according to the Davies-Bouldin index in comparison to CLUTO.

4. The computer-implemented method of claim 1, wherein creating each respective group of messages is performed based on an analysis of just address field values for the messages rather than an analysis of bodies of the messages.

5. The computer-implemented method of claim 1, wherein the method operates as a single pass algorithm rather than an iterative clustering algorithm.

6. The computer-implemented method of claim 1, wherein the data analytics operation identifies the top N closest collaborators to a specified user where N is an arbitrary natural number.

7. The method of claim 1, wherein the data analytics operation comprises an e-discovery operation.

8. The method of claim 1, the data analytics operation comprises a digital forensics operation.

9. The method of claim 8, wherein the data analytics operation further comprises an e-discovery operation.

10. The method of claim 1, wherein the data analytics operation comprises a data retention operation.

11. A system for clustering data to improve data analytics, the system comprising:

an extraction module, stored in memory, that extracts a social graph from a data set of messages, the social graph indicating messages as edges within the social graph such that nodes of the edges indicate corresponding senders and recipients in sender-recipient relationships;

a detection module, stored in memory, that detects communities of collaborators by identifying clusters of nodes within the social graph by minimizing a number of edges that cross between the clusters by performing a smart user replication operation to replicate a user between clusters such that there are no edges that cross between different clusters;

an application module, stored in memory, that applies the identified clusters of nodes within the social graph to a grouping calculation to group the messages of the data set into groups of messages at least in part by creating, for each respective one of the identified clusters of nodes within the social graph, a respective group of messages by adding each message that identifies two separate users from the respective one of the identified clusters in at least one address field of the message to the respective group of messages;

a provisioning module, stored in memory, that provides, through a computing interface, results of a data analytics operation to an end user based at least in part on applying the identified clusters of nodes within the social graph to the grouping calculation to group the messages of the data set into the groups of messages;

at least one physical processor configured to execute the extraction module, the detection module, the application module, and the provisioning module;

wherein:

the extraction module further decouples a user plane from a data plane;

the user plane includes meta-data indicating sender-recipient relationships; and the data plane includes actual underlying content of the messages.

12. The system of claim 11, wherein the messages comprise at least one of:

emails;

email attachments.

13. The system of claim 11, wherein the data analytics operation comprises at least one of:

an e-discovery operation;

a digital forensics operation;

a data retention operation.

14. The system of claim 13, wherein the data analytics operation comprises the e-discovery operation.

15. The system of claim 13, wherein the data analytics operation comprises the digital forensics operation.

16. The system of claim 13, wherein the data analytics operation comprises the data retention operation.

17. The system of claim 11, wherein the extraction module extracts the social graph based on a value in at least one of the following fields:

a sender address field in a message in the messages;

a recipient address field in the message in the messages;

a carbon copy address field in the message in the messages;

a blind carbon copy address field in the message in the messages.

18. The system of claim 11, wherein the identified clusters of nodes within the social graph indicate separate departments within an enterprise organization such that members of a department tend to message other members within the same department rather than a different department according to a statistical measurement.

19. The system of claim 18, wherein the data analytics operation discovers departments within the enterprise organization that were previously unknown to the system performing the data analytics operation.

20. A non-transitory computer-readable medium comprising one or more computer-readable instructions that, when executed by at least one processor of a computing device, cause the computing device to:

extract a social graph from a data set of messages, the social graph indicating messages as edges within the social graph such that nodes of the edges indicate corresponding senders and recipients in sender-recipient relationships;

detect communities of collaborators by identifying clusters of nodes within the social graph by minimizing a number of edges that cross between the clusters by performing a smart user replication operation to replicate a user between clusters such that there are no edges that cross between different clusters;
apply the identified clusters of nodes within the social graph to a grouping calculation to group the messages of the data set into groups of messages at least in part by creating, for each respective one of the identified clusters of nodes within the social graph, a respective group of messages, by adding each message that identifies two separate users from the respective one of the identified clusters in at least one address field of the message to the respective group of messages;
provide, through a computing interface, results of a data analytics operation to an end user based at least in part on applying the identified clusters of nodes within the social graph to the grouping calculation to group the messages of the data set into the groups of messages;
wherein:
the instructions cause the computing device to decouple a user plane from a data plane;
the user plane includes meta-data indicating sender-recipient relationships; and
the data plane includes actual underlying content of the messages.

* * * * *